Feb. 7, 1967  F. L. HERNDON  3,302,836
OUTSIDE SPARE TIRE CARRIER
Filed Sept. 7, 1965

INVENTOR.
Fred L. Herndon
BY
Webster & Webster
ATTORNEYS

United States Patent Office 3,302,836
Patented Feb. 7, 1967

3,302,836
OUTSIDE SPARE TIRE CARRIER
Fred L. Herndon, 303 Keystone Ave.,
Santa Cruz, Calif. 95060
Filed Sept. 7, 1965, Ser. No. 485,517
1 Claim. (Cl. 224—42.24)

This invention relates in general to spare tire carriers for motor vehicles.

In particular, the invention is directed to, and it is a major object to provide, a spare tire carrier designed for outside mounting on an automobile of the close body type, rather than in the trunk of such a vehicle as is now common.

An additional object of this invention is to provide a spare tire carrier—of the general type described—which is especially adapted to be mounted on and to project rearwardly from the engine compartment door at the back of the body of a rear-engine, "compact" automobile; the carrier being designed for, but not limited to, use on a "Volkswagen" sedan.

Another object of the invention is to provide a spare tire carrier which may be readily attached to the metal panel of said engine compartment door without having to make any changes or do any work thereon other than to drill a few bolt holes at certain specified points.

Still another object of this invention is to provide a spare tire carrier so arranged that the tire will be held a sufficient distance back from the metal panel of the engine compartment door so as not to interfere with the passage of cooling air to the vehicle engine through the vents provided in said panel. At the same time, the arrangement of the carrier is such that a "continental" appearance is added to the automobile.

It is also an object of this invention to construct the carrier in such a manner that only a few bolts (projecting through the aforementioned holes) are required to secure the carrier in place and maintain the same in the rigid position necessary to support the weight of a wheel-mounted spare tire.

A further object of the invention is to provide an outside spare tire carrier which is designed for ready and economical manufacture; it being contemplated that such carrier will be made available as a kit for owner installation.

A still further object of the invention is to provide a practical, reliable, and durable outside spare tire carrier and one which is exceedingly effective for the purpose for which it is designed.

These objects are accomplished by means of such structure and relative arrangement of parts as well fully appear by a perusal of the following specification and claims.

Figure 1:
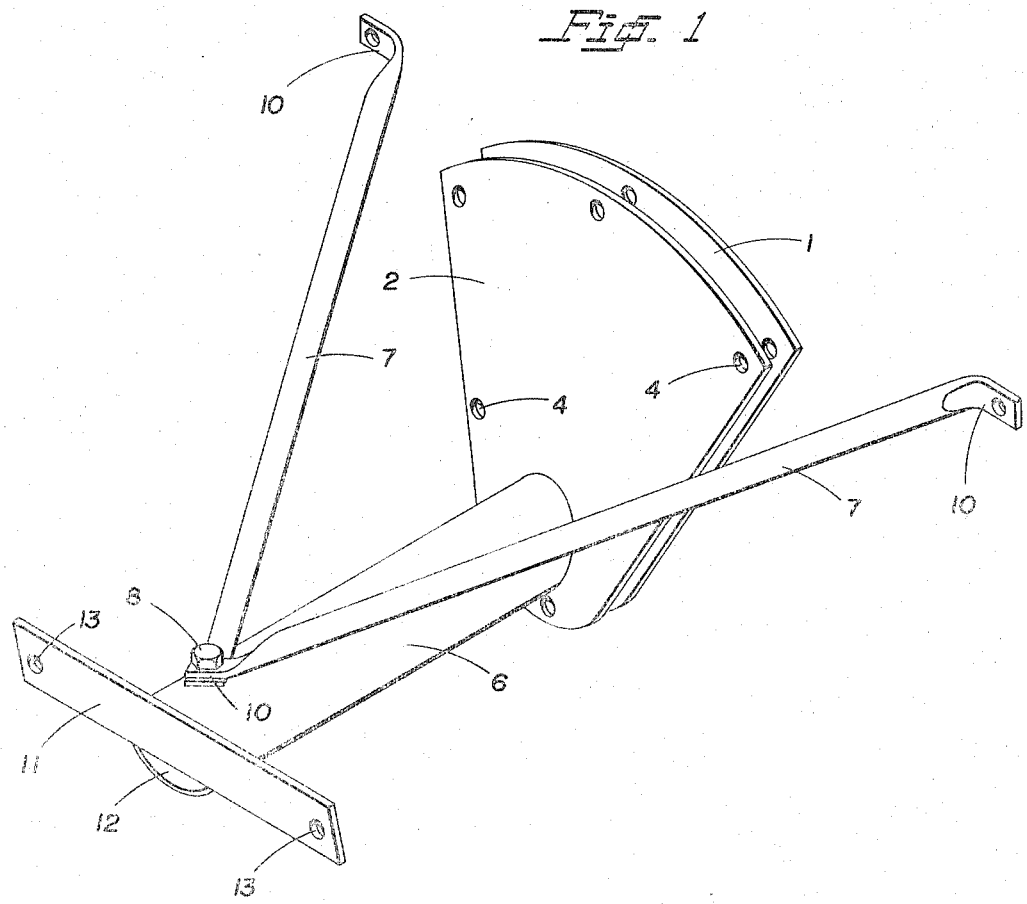
FIG. 1 is a perspective view of the spare tire carrier before being mounted on an automobile.

Referring now more particularly to the drawings and to the characters of reference marked thereon, the spare tire carrier of the present invention comprises a pair of matching front and back plates 1 and 2, respectively, which are rigid, separate from each other, and preferably of generally triangular form with the small end lowermost. The plates 1 and 2 are—if necessary—curved tranversely as well as vertically in order to conform to the contour of and engage flush with the panel 3 of the engine compartment door at the rear of the automobile; said plates being adapted to be disposed on opposite sides of said panel 3.

Near their edges, the plates 1 and 2 are formed with matching bolt holes 4 disposed in suitably spaced relation about said plates. Thus, when the plates 1 and 2 are arranged with the panel 3 therebetween, such plates—of which plate 2 is outermost—are readily secured in clamping relation with said panel 3 and with each other by bolts 5 engaged through the holes 4. The panel 3 is, of course, provided with bolt holes matching the holes 4.

The plates 1 and 2 are of sufficient size and rigidity to prevent any possibility of the panel 3 being buckled or warped by the weight of the supported carrier and wheel-mounted tire thereon.

Rigid with and projecting back from the plate 2 adjacent but above the lower end thereof is a rigid tubular arm 6 of lightweight but strong metal. The arm 6 is braced from the panel 3 by a pair of laterally diverging and upwardly sloping, rigid tubular braces 7 also of lightweight but strong metal.

The braces 7 are secured in common at their outer or lower ends to the arm 6 on top and adjacent the rear end of the latter by a mounting bolt 8. At their inner or upper ends the braces 7 are bolted, as at 9, to the panel 3 laterally out from the plate 2 and substantially on a level with the upper edge thereof, as indicated in FIG. 1. The tubular braces 7 are formed at their inner or upper ends with flattened ears 10 in order to provide the necessary flat surfaces for bolted engagement with said panel 3.

The rear end of the tubular arm 6 is straight-cut transversely, and welded on to said end of the arm is a horizontally extending cross bar 11; such bar being flat and facing to the rear. The cross bar 11 extends equal distances on opposite sides of the arm 6, but the height of such cross bar is less than that of the arm 6 so that an exposed opening 12 into the arm is left at its rear end at the bottom, as shown in FIG. 1.

Adjacent its ends the cross bar 11 is provided with bolt holes 13; the spacing of which matches the spacing of the bolt holes in the wheel disc 14 of the spare tire and wheel unit 15 which the carrier is designed to support. Bolts 16, having wing nuts 17 on their ends behind the cross bar 11, are employed to detachably secure the wheel disc 14 to said bar.

Figure 2:
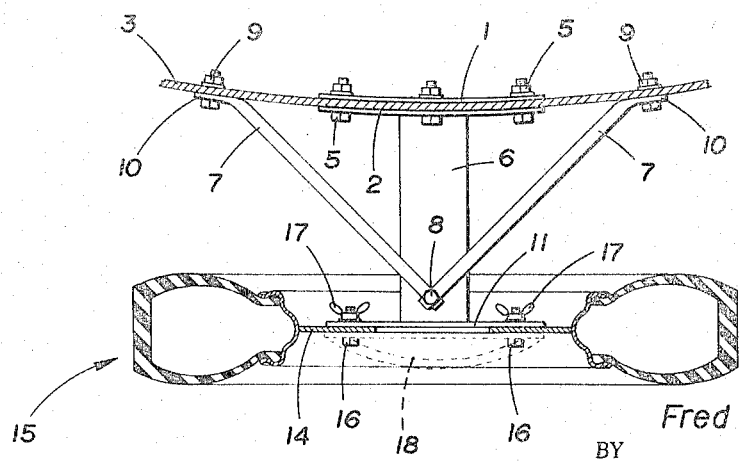
FIG. 2 is a top plan view of the carrier, on a reduced scale, as secured on an automobile and with a wheel-mounted tire in place on said carrier; the wheel and tire being in section, as well as the panel of the engine compartment door.

It may here be noted that the license plate holder and light unit 18 of the automobile (which is initially secured on panel 3 centrally thereof) may be detached and mounted on the wheel disc 14 in connection with the bar 11, as indicated in FIG. 2. When the unit 18 is so mounted, the necessary disconnectable wiring therefor is extended through the tubular arm 6 and rear-end opening 12 to connection with said unit 18.

From the foregoing description, it will be readily seen that there has been produced such an outside spare tire carrier as substantially fulfills the objects of the invention, as set forth herein.

While this specification sets forth in detail the present and preferred construction of the outside spare tire carrier, still in practice such deviations from such detail may be resorted to as do not form a departure from the spirit of the invention, as defined by the appended claim.

Having thus described the invention, the following is claimed as new and useful and upon which Letters Patent is desired:

A spare tire and wheel unit carrier, for attachment to an upstanding body panel of a motor vehicle, comprising a rigid plate formed to flatly abut against said panel, means to secure the plate against the panel, an arm projecting outwardly from and rigid with the plate, and means on the outer end of the arm to detachably support the spare tire and wheel unit; said last named means comprising a rigid cross bar secured on the arm and provided with bolt holes matching corresponding holes on the wheel, the arm being tubular and the cross bar being positioned to leave a portion of the arm open at its outer end.

References Cited by the Examiner

UNITED STATES PATENTS

| | | | |
|---|---|---|---|
| 1,366,239 | 1/1921 | Barr | 224—42.12 |
| 1,848,975 | 3/1932 | Proctor | 224—42.24 |
| 2,117,049 | 5/1938 | Widman et al. | |
| 2,701,670 | 2/1955 | Hutchinson. | |
| 2,805,807 | 9/1957 | Slack | 224—42.24 X |

GERALD M. FORLENZA, *Primary Examiner.*

F. E. WERNER, *Assistant Examiner.*